United States Patent

Hara et al.

[11] Patent Number: 5,805,373
[45] Date of Patent: Sep. 8, 1998

[54] HEAD POSITION ERROR COMPENSATION IN DISK DRIVES

[75] Inventors: Takeyori Hara; Isamu Tomita; Taturo Sasamoto; Nobuyuki Suzuki; Masafumi Sato, all of Kawasaki, Japan

[73] Assignee: Fujitsu Limited, Kawasaki, Japan

[21] Appl. No.: 422,150

[22] Filed: Apr. 14, 1995

[30] Foreign Application Priority Data

Apr. 14, 1994 [JP] Japan .................................. 6-075809

[51] Int. Cl.⁶ .................................................. G11B 5/596
[52] U.S. Cl. ................................ 360/77.07; 360/78.04
[58] Field of Search ........................... 360/78.04, 77.01, 360/77.02, 77.04, 77.06, 77.07, 77.08, 31, 76

[56] References Cited

U.S. PATENT DOCUMENTS

| | | | |
|---|---|---|---|
| 4,969,059 | 11/1990 | Volz et al. | 360/77.04 X |
| 5,073,833 | 12/1991 | Best et al. | 360/77.08 X |
| 5,164,866 | 11/1992 | Sano et al. | 360/77.08 |
| 5,233,487 | 8/1993 | Christensen et al. | 360/77.04 |
| 5,257,149 | 10/1993 | Meyer | 360/78.08 X |
| 5,500,776 | 3/1996 | Smith | 360/77.08 X |

FOREIGN PATENT DOCUMENTS

| | | | |
|---|---|---|---|
| 2079666 | 4/1993 | Canada | 360/77.04 |
| 5-81796 | 4/1993 | Japan. | |

*Primary Examiner*—Andrew L. Sniezek
*Attorney, Agent, or Firm*—Greer, Burns & Crain, Ltd.

[57] ABSTRACT

This invention relates to a disk drive and a method of writing data to the disk drive. In a disk drive including a write head, a read head and a positioning unit of a head which includes a write element and a read element, the present invention provides the disk drive with a position error measuring unit for measuring the amount of a position error of the write element and the read element; and a write/read control unit for obtaining an offset amount of the head in accordance with the amount of the position error of the head, setting the offset amount to the positioning unit so as to offset the head, and effecting data write/read operation. When format write operation is executed, only an ID portion is offset in the same direction as the direction of the position error so measured in accordance with the measured amount of the position error, and is written.

10 Claims, 12 Drawing Sheets

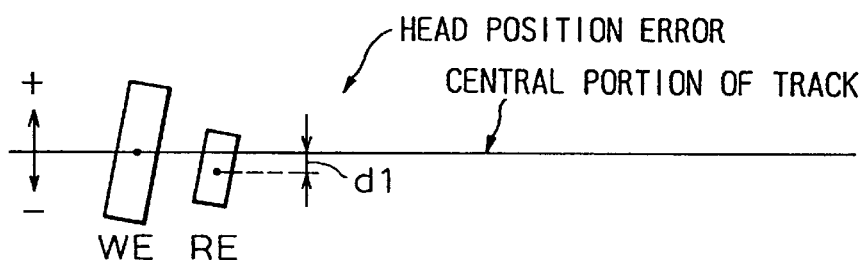
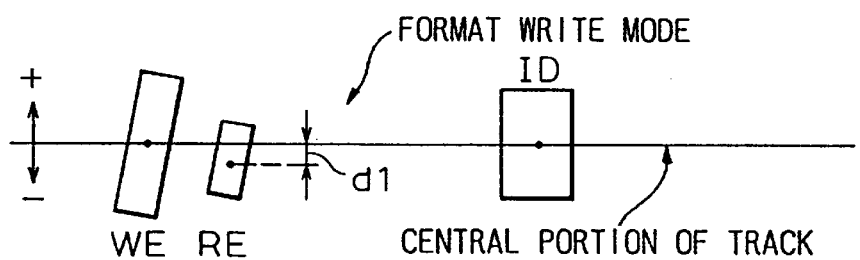
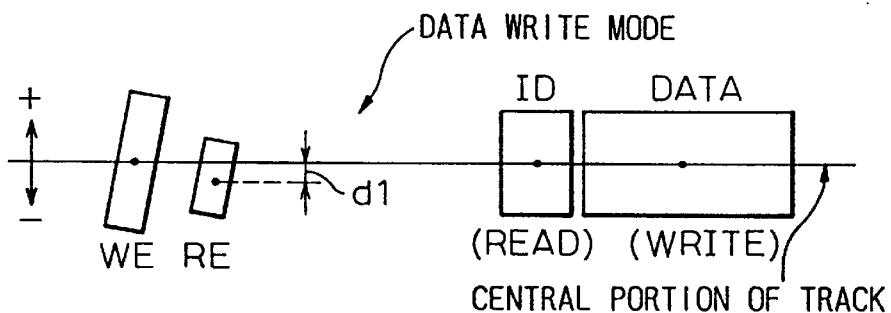
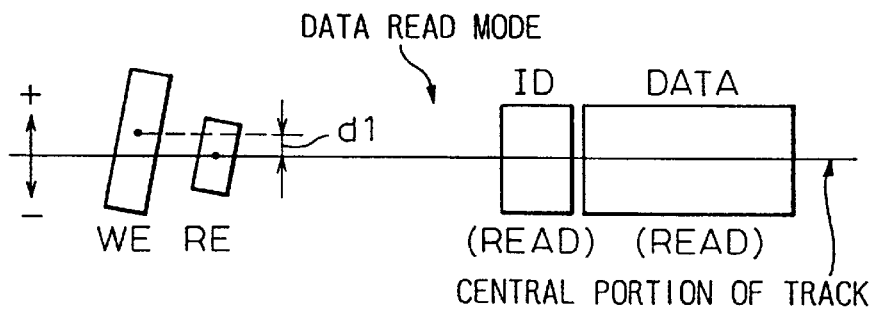

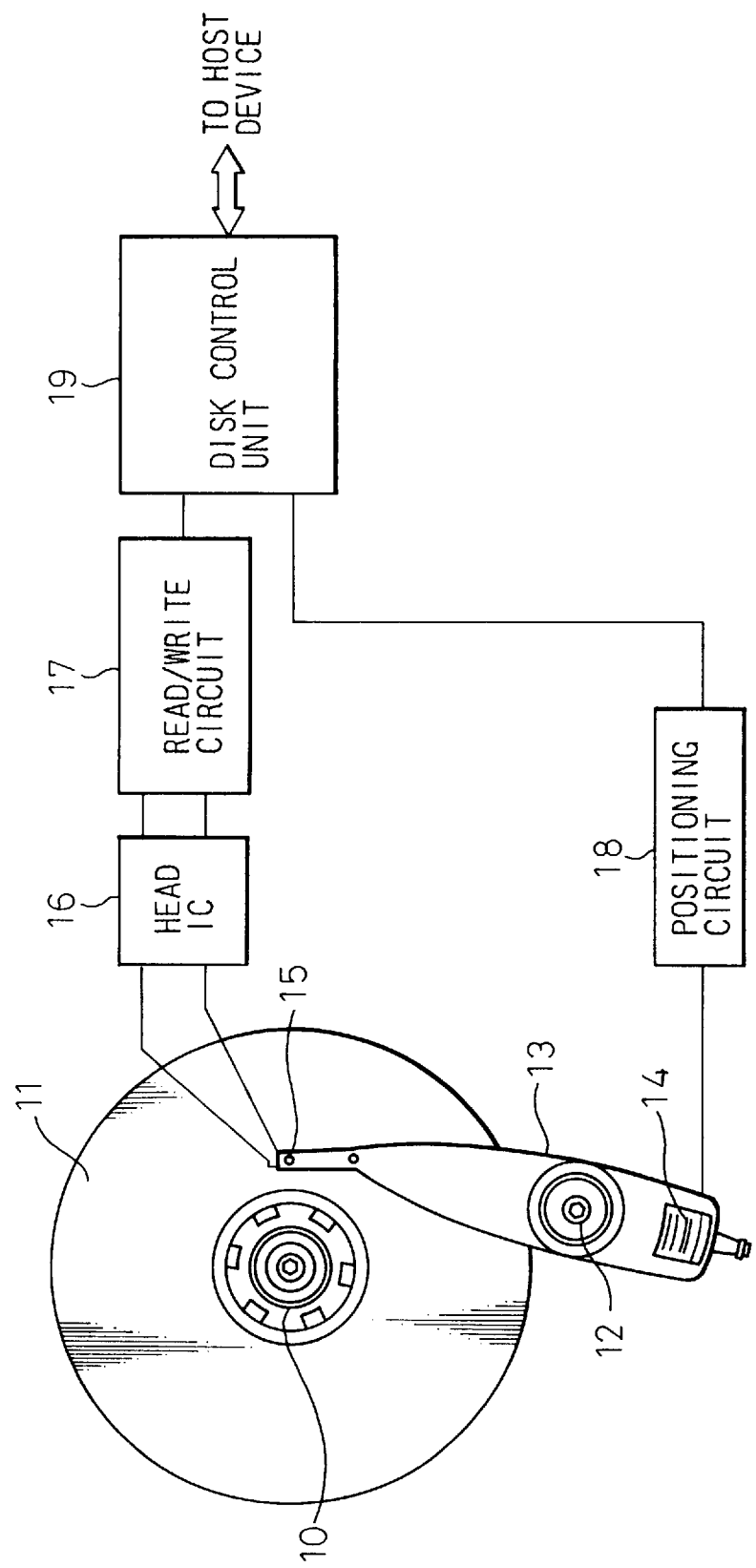

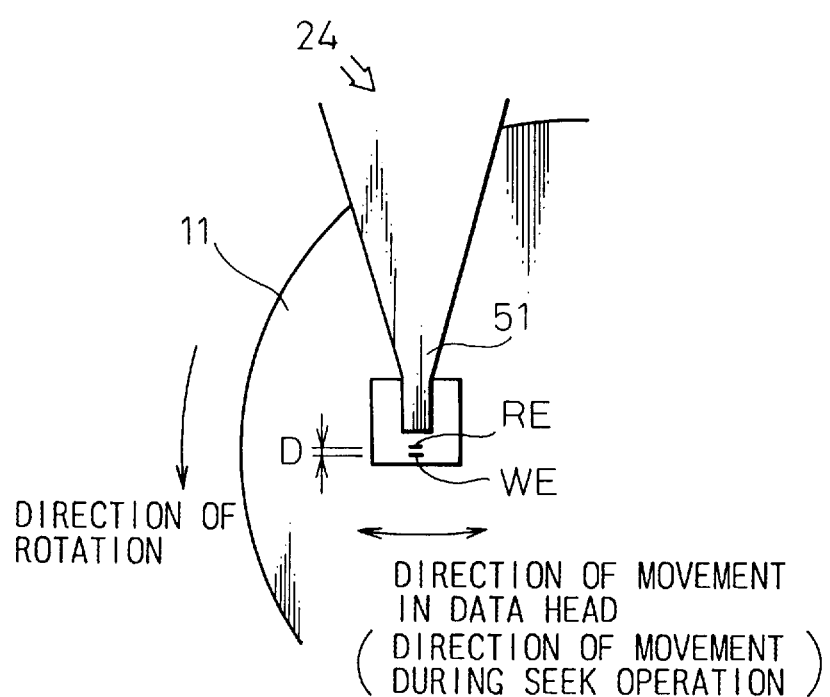

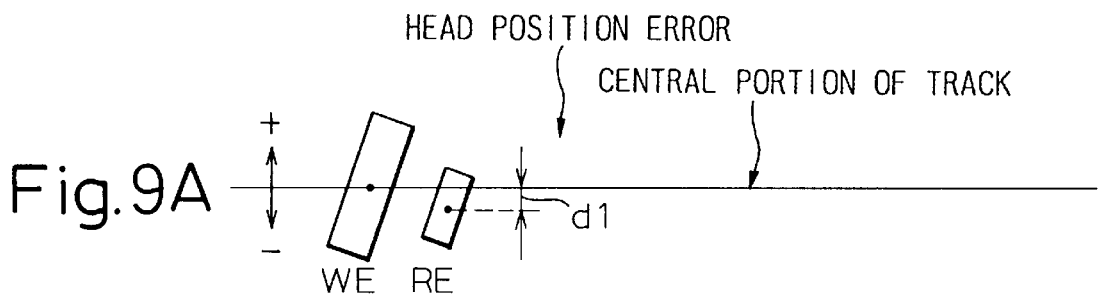
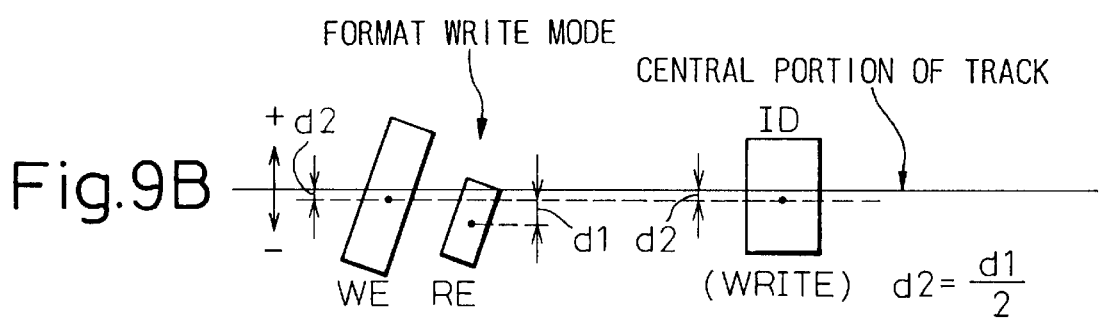
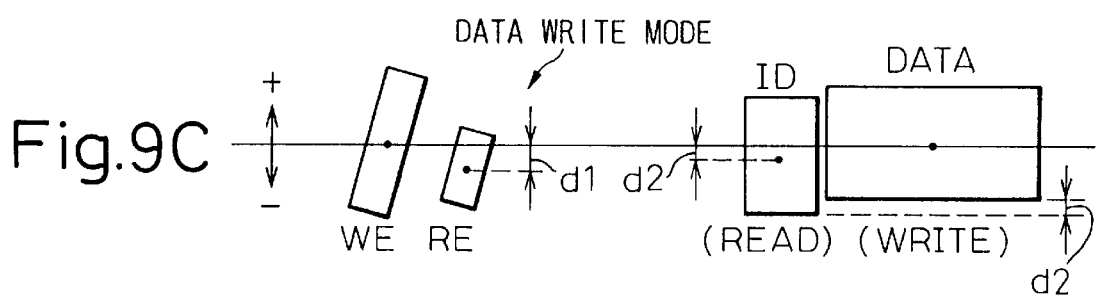
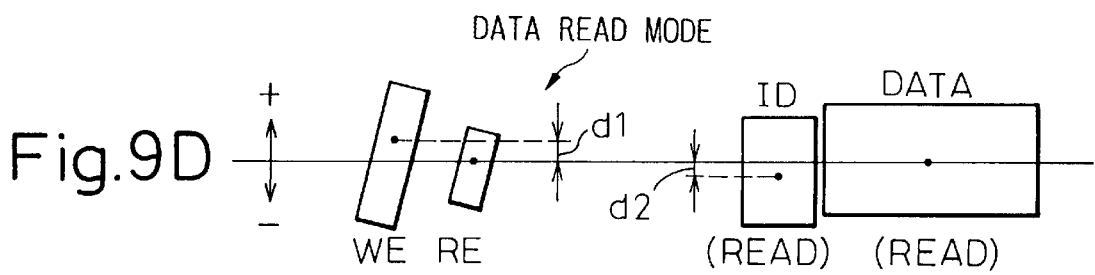

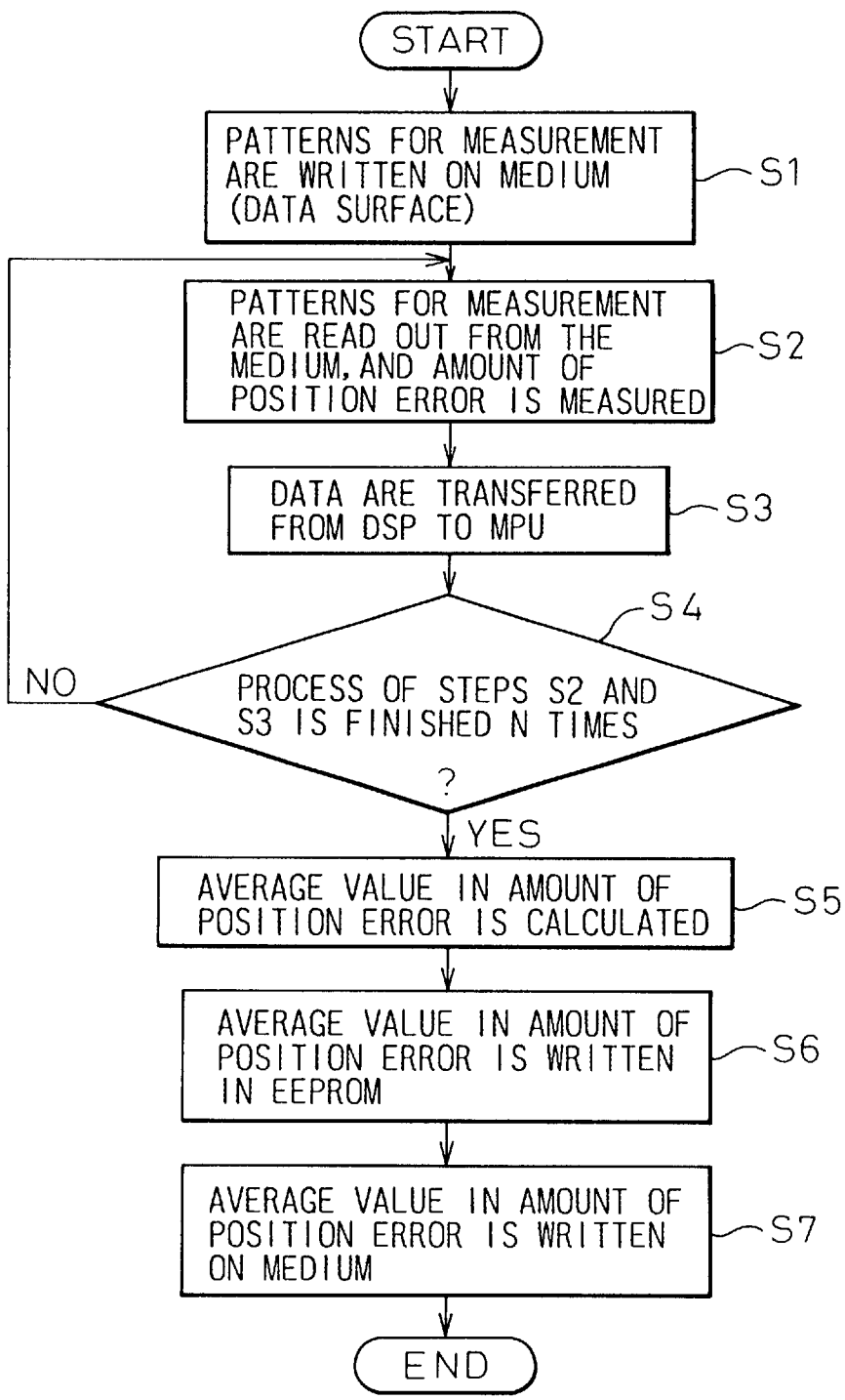

Fig.11

EEPROM

| TABLE ABOUT AMOUNT OF POSITION ERROR AT THE TIME OF SHIPMENT FROM FACTORY | | |
|---|---|---|
|  | INNER PART OF CYLINDERS | OUTER PART OF CYLINDERS |
| HEAD #0 | e1 | a1 |
| HEAD #1 | f1 | b1 |
| HEAD #2 | g1 | c1 |
| ⋮ | ⋮ | ⋮ |
| HEAD #n |  |  |

| TABLE ABOUT AMOUNT OF POSITION ERROR AT THE TIME OF WORKING | | |
|---|---|---|
|  | INNER PART OF CYLINDERS | OUTER PART OF CYLINDERS |
| HEAD #0 | e2 | a2 |
| HEAD #1 | f2 | b2 |
| HEAD #2 | g2 | c2 |
| ⋮ | ⋮ | ⋮ |
| HEAD #n |  |  |

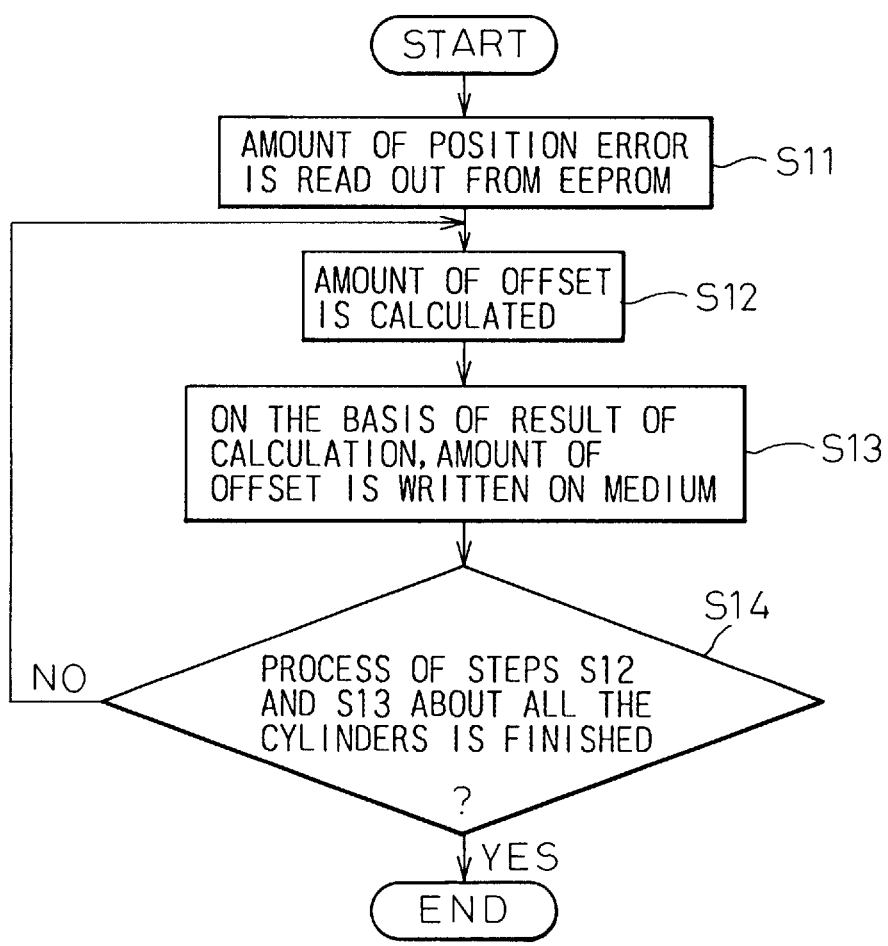

HEAD POSITION ERROR COMPENSATION IN DISK DRIVES

BACKGROUND OF THE INVENTION

1. Field of the Invention

This invention relates to a disk drive which has a structure wherein a write/read head includes a write element and a read element disposed in the mutually spaced-apart relationship by a predetermined distance, and which can be utilized for a magnetic disk drive, etc, and a method for writing data in the disk drive.

In recent years, the size of disk drives has been reduced while their storage capacity has been increased and along with this tendency, a recording density in a medium has been increased. In magnetic disk drives, for example, a track density of the medium and a bit density at the time of write operation have been remarkably improved.

To improve the bit density in the magnetic disk drive described above, a head using an MR device (a head utilizing a magneto-resistance effect), which provides a high read signal level, has been used nowadays as a head for reading data in place of a conventional inductive head.

Accordingly, a head including a write element, which comprises an inductive device for write operation, and a read element, which comprises an MR device for read operation, has been used as the head in the magnetic disk drive. However, such a head involves the problem that a read error is likely to occur due to a position error of the head because the positions of the elements are mutually different in a track direction. Therefore, the improvement of read characteristics is particularly required.

2. Description of the Related Art

FIGS. 1A to 1D are explanatory views of the read/write modes according to the prior art. FIG. 1A shows a head position error, FIG. 1B shows the state of format write mode (at the time of ID write mode), FIG. 1C shows the state of data write mode (at the time of ID read mode+DATA write mode), and FIG. 1D shows the state of data read mode.

In FIGS. 1A to 1D, symbol WE represents a write element, RE is a read element, ID is an ID portion of a medium, DATA is a data portion of the medium and d1 is a position error. Hereinafter, an example of the magnetic disk drive according to the prior art will be explained.

In the magnetic disk drive including a write/read head having a structure wherein a write element and a read element are so disposed as to be spaced apart by a predetermined distance from each other (for example, a head using an inductive element and an MR element) according to the prior art, a position error occurs between the read element and the write element due to influences of a yaw angle of an actuator, and so forth.

In the magnetic disk drive described above, data are written in a sector unit into a medium. In this case, sector information is written by disposing an ID portion in front of a data portion in each sector. When the data is written or read, data write operation is effected by reading the ID portion so as to confirm the sector position.

When the head described above which includes the read element and the write element is used, however, the position error occurs between the read element and the write element. Therefore, the read element is positioned to the center of the track (i.e., central portion of the track) by correcting this position error at the time of read operation.

Hereinafter, a more concrete explanation will be made with reference to FIGS. 1A to 1D.

It will be assumed, for example, that the core of the read element RE and the core of the write element WE have a position error d1 (position error=d1). In this case, the position error is plotted on one of the sides with respect to the track center as positive (+) and the other, negative (−). Accordingly, in the case of the example shown, the position error d1 exists on the negative side (−).

By the way, when data are written into the medium, a physical format processing (format write operation) is executed in advance, and the ID portion must be written for each sector by this physical format processing.

In this physical format processing (format write operation), the ID portion is written into the medium by setting a servo offset to zero (0) and positioning the write element WE to the central portion of the track (i.e., track center position). Accordingly, the ID portion is written into the track center position, as shown in FIG. 1B.

The data are written into the data portion of the medium under the state where the physical format processing is effected as described above, but at the time of data write operation, the ID portion written into the medium is first read so as to confirm the sector position, and then data write process (data write operation) to the data portion (DATA) is carried out.

When this data write operation is effected, the data write process is carried out by setting the servo offset to 0 as shown in FIG. 1C. In this case, the center of the write element WE exists at the track center position, but the center of the read element RE deviates by d1 towards the negative (−) side with respect to the track center.

Under this state, the read element RE first reads the ID portion but in this case, the ID portion is written at the track center position and the center of the read element RE deviates by d1 with respect to the track center.

For this reason, the center of the read element RE deviates by d1 towards the negative (−) side with respect to the center of the ID portion. In other words, the position error of the read head with respect to the ID portion is d1.

As described above, the ID portion is read by the read element RE with the position error d1 to confirm the sector position, and then the data are written into the data portion (DATA) by the write element WE. In this case, since the position of the write element WE exists at the track center, the data can be written into the track center.

To read the data portion (DATA) so written, the servo offset is set to +d1 as shown in FIG. 1D. The write element WE deviates by d1 towards the positive (+) side with respect to the track center by so doing, but the read element RE exists at the track center.

However, the disk drive according to the prior art involves the following problems.

(1) In the magnetic disk drive including the write/read head which comprises the write element and the read element, the position error occurs between the read element and the write element.

Therefore, this position error is corrected at the time of read operation and the read element RE is brought to the track center. In this way, data read operation can be normally carried out. At the time of write operation, however, the write element WE must be positioned at the track center and consequently, the read element RE exists at the position which deviates by the position error distance from the track center.

Under this state, the read element RE reads the ID portion to confirm the sector position, and then the write element writes the data into the data portion. However, when the ID portion is read, the read element reads the ID portion, which is written at the track center, at the position deviating from the track center. Therefore, when the position error is large, the read error of the ID portion occurs.

In other words, when the position error between the read element and the write element is large, the offset of the read element exceeds an allowable maximum value in ID read at the time of write operation, and the ID read error sometimes occurs. (2) To prevent the read error occurring when the ID portion is read at the time of write operation described above, it may be possible to effect the position error correction only at the time of reading the ID portion. In other words, the read element is first offset to the track center position so as to read the ID portion at the time of data write operation, and then the write element is positioned to the track center position (offset=0) so as to write the data into the data portion.

In this way, the read error of the ID portion can be prevented. In this case, however, it becomes necessary to switch read operation of the ID portion to write operation of the data portion.

In other words, switch control of the head becomes complicated, and because read operation of the data portion cannot be made immediately after read operation of the ID portion, waiting for the revolution of the medium becomes necessary and the data write process becomes delayed. Accordingly, this method cannot be easily accomplished in practice.

SUMMARY OF THE INVENTION

In view of the above-mentioned problems, the main object of the present invention is to provide a disk drive and a head method for writing data in this disk drive, which enable a head to assuredly read an ID portion at the time of write operation even when a position error between a read element and a write element of a head is large.

A further object of the present invention is to provide a disk drive and a method for writing data in this disk drive, in which it becomes unnecessary to switch read operation of the ID portion to write operation of the data portion.

A still further object of the present invention is to provide a disk drive and a method for writing data in this disk drive, in which a process for measuring the amount of a position error between a read element and a write element of a head can be simplified.

In a disk drive including a head for effecting write/read operation of data to and from a recording medium and positioning means for positioning the head to a target position of the recording medium, wherein a write element and a read element are disposed on the head with a predetermined distance between them, the objects of the invention described above can be accomplished by a disk drive including position error measurement means for measuring a position error of the write element and the read element; ID portion write offset decision means for deciding in which direction and with which offset an ID portion should be written when the ID portion is written to the recording medium, in accordance with the position error so measured (amount of the position error and its direction); and ID portion offset write control means for offsetting only the ID portion in the same direction as that of the position error and writing the ID portion on the basis of the offset value decided by the ID portion write offset decision means when a format processing is executed by writing the ID portion.

Preferably, the position error measurement means described above has the function of measuring the position error of the write element and the read element for each position (track) of the recording medium for all the heads.

Further, preferably, the disk drive includes a writable non-volatile memory for storing and holding the position error information as the result of measurement by the position error measurement means.

Further, preferably, the position error measurement means described above includes information updating means for updating the position error information to the latest position error information by periodically executing the process for measuring the position error of the write element and the read element for each position (track) of the recording medium for all the heads.

In a method for writing data into a disk drive including a head for effecting write/read operation of data to and from a recording medium and positioning means for positioning the head to a target position of the recording medium, wherein a write element and a read element are disposed on the head with a predetermined distance between them, the method for writing data to a disk drive according to the present invention comprises the steps of measuring a position error of the write element and the read element and storing position error information; and offsetting only an ID portion in the same direction as the direction of the position error so measured in accordance with the amount of the position error, and writing the ID portion, when the ID portion is written to the recording medium so as to execute a format processing.

Further, preferably, in the method for writing data into a disk drive according to the present invention, when the ID portion is offset and written to the recording medium, the offset direction of the ID portion is set to the same direction as the direction of the position error of the write element and the read element, and the offset amount is set to a half value of the amount of the position error of the write element and the read element.

Further, preferably, in the method for writing data into a disk drive according to the present invention, when the ID portion is offset and written to the recording medium, an upper limit value is set to the offset amount, and when the offset amount exceeds this upper limit value, it is limited to the upper limit value.

Further, preferably, in the method for writing data into a disk drive according to the present invention, when the ID portion is written by offsetting it, the write operation is executed for each position (track) on the recording medium for every head.

Further, preferably, in the method for writing data into a disk drive according to the present invention, the amount of the position error of the write element and the read element is periodically measured, and when the amount of the position error as the result of measurement exceeds a predetermined value, only the ID portion is written again.

Further, preferably, in the method for writing data into a disk drive according to the present invention, when the amount of the position error of the write element and the read element is measured, measuring patterns used for measuring the amount of position error are offset by a half value (½) of the track width and written to a data surface of the recording medium, and immediately thereafter, the amount of the position error of the write element and the read element is measured from the difference of the outputs obtained by reading the measuring patterns.

Further, preferably, in the method for writing data into a disk drive according to the present invention, when the amount of the position error of the write element and the read element is measured, measurement is made at at least two positions on outer and inner sides for each head, and the amount of the position error between these at least two positions is obtained by an interpolation process.

The present invention described above provides the following advantages.

(1) The amount of the position error of the read element and the write element of the head is measured for each head, and when a format is written, the ID portion is offset in the same direction as the direction of the position error and a write operation is then carried out.

Accordingly, in the ID read operation at the time of write operation, a read operation can be carried out with a smaller error than the amount of the position error described above, and the ID read operation can be made reliably.

(2) When the offset amount when writing ID at the time of format write operation is set to the half value (i.e., ½) of the amount of the position error of the read element and the write element, the greatest margin can be secured.

Therefore, even when the position error between the read element and the write element, is great the read operation of the ID portion at the time of write operation can be reliably carried out.

(3) The amount of the position error of the read element and the write element is periodically measured so as to update the data of the amount of the position error. Therefore, the amount of the offset can be always set by using the latest amount of the position error at the time of read/write operation.

(4) When the ID portion is offset and written to the recording medium, it is limited to the upper limit value when the former exceeds the latter. Accordingly, any adverse influences on adjacent tracks can be prevented.

(5) The measurement of the amount of the position error of the read element and the write element is periodically carried out, and when the amount of the position error as the result of the measurement exceeds a predetermined value, only the ID portion is written again.

Therefore, the ID portion can be always written with the offset amount which is in match with the latest amount of the position error, and no read error occurs in the read operation of the ID portion at the time of write operation.

(6) When the amount of the position error of the write element and the read element is measured, measurement is made at two positions on the outer and inner sides for each head, and the amount of the position error between these two positions is obtained by a technique represented by linear interpolation, curvelinear interpolation, or the like.

Accordingly, the measurement process can be simplified, the data quantity which is to be stored in an EEPROM becomes small, and the memory capacity can be reduced.

BRIEF DESCRIPTION OF THE DRAWINGS

The above and other objects and features of the present invention will become more apparent from the following description of the preferred embodiments with reference to the accompanying drawings, wherein:

FIGS. 1A to 1D are explanatory views of a read/write mode according to the prior art;

FIG. 3 is a block diagram of a magnetic disk drive according to a preferred embodiment of the present invention;

FIG. 7 is an explanatory view (No. 1) of the relation between a yaw angle and a position error in the preferred embodiment of the present invention;

FIGS. 9A to 9D are explanatory views of the read/write mode in the preferred embodiment of the present invention;

FIG. 10 is a flowchart of a calibration process at the time of shipment from a factory in the preferred embodiment of the present invention;

FIG. 11 is a position error table in the preferred embodiment of the present invention; and FIG. 12 is a flowchart of a physical format processing in the preferred embodiment of the present invention.

DESCRIPTION OF THE PREFERRED EMBODIMENTS

Figure 2A:
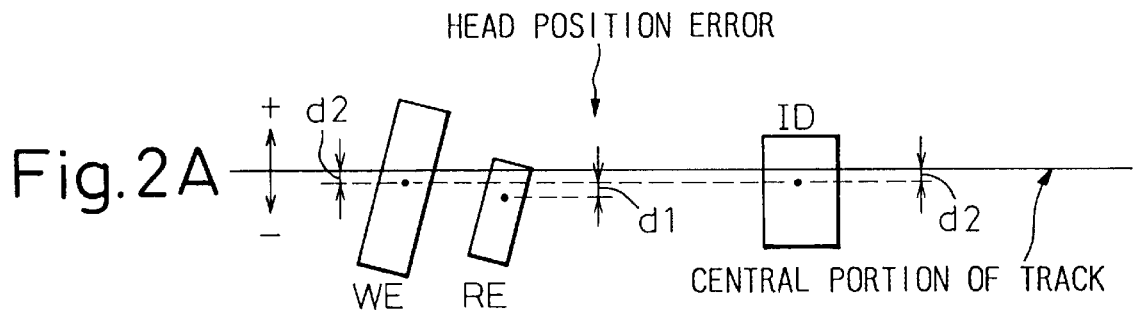
FIGS. 2A to 2C are explanatory views useful for explaining a fundamental embodiment on the basis of the basic principle of the present invention.
Figure 2B:
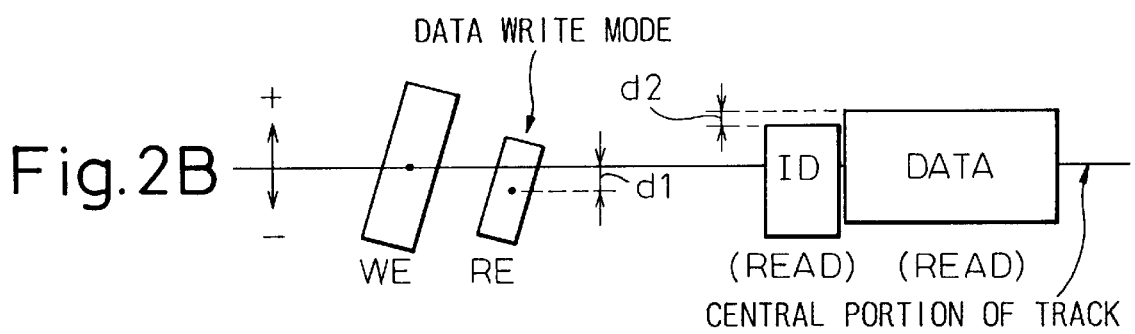
Figure 2C:
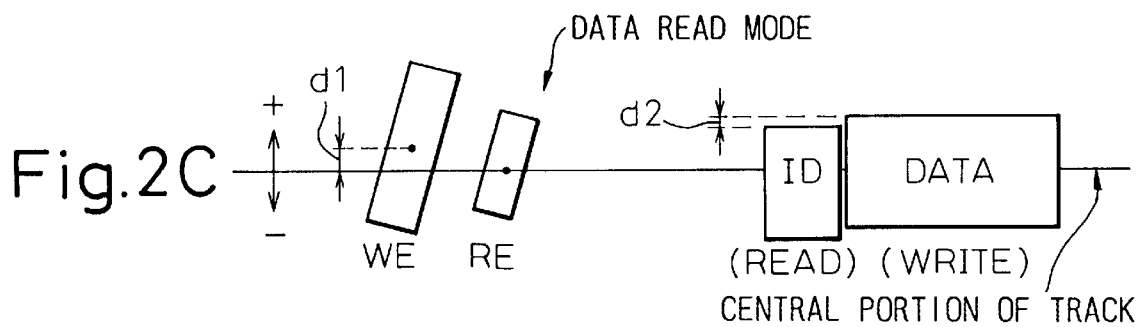

FIGS. 2A to 2C are explanatory views of a fundamental embodiment on the basis of the basic principle of the present invention, and in these drawings, like reference numerals are used to identify like constituents as in FIGS. 1A to 1D. To accomplish the foregoing objects, in a disk drive including a head for writing/reading data to and from a recording medium and positioning control means for positioning the head to a target position of the recording medium, wherein the head includes a write element and a read element, the disk drive according to the present invention includes position error measuring means for measuring a position error between the write element and the read element; a non-volatile memory for storing and holding the position error as the result of the measurement by the position error measuring means; ID portion write offset deciding means for deciding in which direction and by which offset an ID portion should be written into the recording medium in accordance with the position error so measured (the position error distance and its direction); and ID portion offset write control means for offsetting only the ID portion in the same direction as the position error and writing the ID portion on the basis of the offset value decided by the ID portion write offset deciding means when a format processing is executed by writing the ID portion.

The function of the present invention on the basis of the construction described above will be explained with reference to FIGS. 2A to 2C.

When an MR head is used, a position error occurs between the read element RE and the write element WE. Therefore, in the magnetic disk drive, the position error between the read element and the write element is measured in advance for each head by the position error measuring means, and the data of the measurement result (position error data) are stored in the non-volatile memory.

Then, a servo format is set to the positioning control means on the basis of the position error data stored in the non-volatile memory so as to execute a physical format processing (format write operation) of the medium, data read/write process from and to the medium, and so forth.

It will be assumed, for example, that a position error d1 exists between the center of the read element RE and that of the write element WE (position error=d1) as shown in FIG. 2A. In this case, the position error is illustrated by setting one of the sides to the positive (+) side and the other, to the negative (−), with respect to the track center. Therefore, in the example shown, the position error d1 exists on the negative (−) side.

By the way, in order to write the data to the medium, it is necessary to execute in advance the physical format processing (format write operation) of the medium and to write the ID portion for each sector by this physical format processing.

In this format processing, servo offset=−d2 as shown in FIG. 2A. In other words, the servo offset d2 (offset d2 on the negative side) is set in the same direction as the position error direction (position error d1 on the negative side) of the read element RE with respect to the write element WE, and the ID portion is written to the medium.

In this case, the ID portion is written to the medium under the state where the write element WE deviates by d2 on the negative (−) side with respect to the track center. Therefore, the ID portion is written to the position which deviates by d2 on the negative side with respect to the track center. By the way, it will be assumed hereby that the servo offset d2 is a half value of the position error d1 (d2=d1/2).

The data are written to the medium under the state where the physical format processing is executed as described above. When the data are written (at the time of data write operation), the ID portion written to the medium is first read so as to confirm the sector position, and then, a write process of the data (data write) to the data portion (DATA) is carried out.

At the time of this data write operation, the data write process is executed by setting the servo offset to zero (0), as shown in FIG. 2B. In this case, the center of the core of the write element WE exists at the track center, but the read element RE deviates by d1 on the negative side with respect to the track center.

The ID portion is first read by the read element RE under this state. In this instance, the ID portion is written to the position which deviates by d2 on the negative side with respect to the track center, whereas the center of the read element RE deviates by d1 on the negative side with respect to the track center.

Accordingly, the center of the read element RE deviates by d1−d2 (d2<d1) on the negative side with respect to the center of the ID portion. In other words, the position error of the read head with respect to the ID portion is d1−d2. Since d2=d1/2 in this embodiment, the position error of the read element with respect to the ID portion is one half of d1 (d1/2).

The ID portion is read by the read element with the position error d1/2 as described above so as to confirm the sector position, and then the data are written to the data portion (DATA) by the write element WE. Because the position of the write element WE exists at the track center at this time, the data portion (DATA) can be written to the track center.

Next, to read the data portion (DATA) written in the manner described above, the servo offset is set to +d1 as shown in FIG. 2C. At this time, the write element WE deviates by d1 on the positive side with respect to the track center, but the read element RE exists at the track center.

Though the ID portion deviates by d2 on the negative side with respect to the track center, the position error between the read element RE and the ID portion is d2. The data portion (DATA) is read under such a state.

According to the arrangement described above, read of the ID portion at the time of write operation needs be only the half value of the position error even when the position error is large between the write element and the read element. In other words, even when the position error is large between the read element and the write element, read operation of the ID portion at the time of write operation can be carried out reliably.

Hereinafter, some preferred embodiments of the present invention will be explained with reference to the accompanying drawings.

FIGS. 3 to 12 illustrate the preferred embodiments of the present invention. In these drawings, reference numeral 10 denotes a spindle motor, 11 is a magnetic disk (recording medium), 12 is a rotary shaft, 13 is an actuator, 14 is a voice coil (hereinafter called "VCM coil"), 15 is a magnetic head, 16 is a head IC, 17 is a read/write circuit, 18 is a positioning circuit, 19 is a disk control unit, 20 is a disk enclosure (hereinafter called "DE"), 23 is a servo head, 24 and 24-1 to 24-n are data heads, 25 is a servo head IC, 26 is a data head IC, 27 is a digital signal processor (hereinafter called "DSP"), 28 is a memory, 29 is a servo demodulation circuit, 30 is a VCM driver circuit, 31 is a DCM driver circuit, 34 is a communication IC, 25 is a microprocessor (hereinafter called "MPU"), 36 is a demodulation circuit (DEM), 37 is an encoder/decoder circuit (ENC/DEC), 38 is a bias current control circuit, 40 is an EEPROM (electrically erasable programmable read-only memory), 41 is a DRAM (dynamic RAM), 42 is a buffer, 43 is a hard disk controller (hereinafter called "HDC"), 44 is a voice coil motor (hereinafter called "VCM"), 48 is a spindle, 49 is a servo surface, 50 is a data surface, 51 is a head assembly, 54 is a core slider, 55 is a coil, 56 is an upper core, 57 is a lower core, 58 to 61 are terminals, and 62 is a recording medium.

§1: Explanation of overall structure of magnetic disk drive . . . see FIG. 3

FIG. 3 is a block diagram of the magnetic disk drive. Hereinafter, the overall construction of the magnetic disk drive will be explained with reference to FIG. 3.

As shown in FIG. 3, the magnetic disk drive includes the magnetic disk (recording medium) 11 driven for rotation by the spindle motor 10, the actuator 13 rotating with the rotary shaft 12 being the center, the VCM coil 14 disposed at one of the ends (rear end) of the actuator 13, the magnetic head 15 disposed at the other end (distal end) of the actuator, and so forth.

By the way, the magnetic head 15 includes a write head constituted by an inductive element and a read head constituted by an MR element.

The head IC 16 is connected to the magnetic head 15, and the read/write circuit 17 is connected to the head IC 16. The read/write circuit 17 is further connected to the disk control unit 19. On the other hand, the positioning circuit 18 is connected to the VCM coil 14 and to the disk control unit 19.

The head IC 16 is the circuit which supplies a write current and a bias current to the magnetic head 15, and the read/write circuit 17 demodulates the read data and processes the write data.

The positioning circuit 18 carries out servo control of the VCM coil 14. The disk control unit 19 controls the read/write circuit 17 and the positioning circuit 18, and effects data read/write operation from and to a desired track of the magnetic disk 11.

§2: Explanation of detailed construction of magnetic disk drive . . . .

Figure 4:
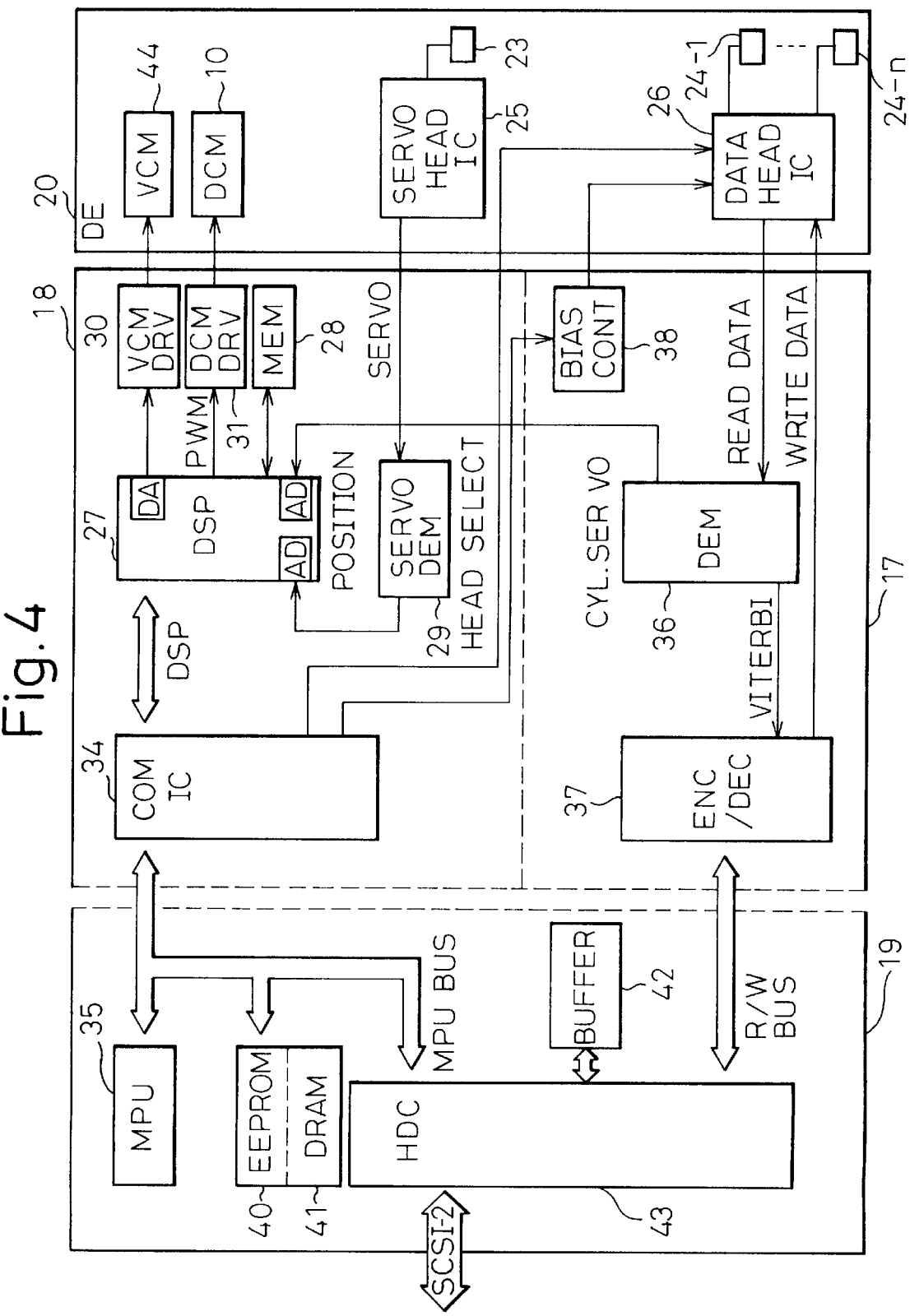
FIG. 4 is a detailed block view of the magnetic disk drive according to the preferred embodiment of the present invention.

FIG. 4 is a detailed block diagram of the magnetic disk drive. Hereinafter, the detailed construction of the magnetic disk drive will be explained with reference to FIG. 4.

The magnetic disk drive has the disk control unit 19, the positioning circuit 18, the read/write circuit 17 and the DE 20, as shown in FIG. 4.

The disk control unit 19 includes the MPU 35, the EEPROM 40, the DRAM 41, the buffer 42 and the HDC 43, and the read/write circuit 17 includes the demodulation circuit 36, the encoder/decoder circuit 37 and the bias current control circuit 38.

The positioning circuit 18 includes the memory 28, the servo demodulation circuit 29, the VCM driver circuit 30, the DCM driver circuit 31 and the communication IC 34.

Further, the DE 20 includes the VCM 44, the spindle motor (DCM: D.C. motor) 10, the servo head IC 25, the data head IC 26, the servo head 23 and the data heads 24-1 to 24-n.

Incidentally, the head IC 16 shown in FIG. 3 includes the servo head IC 25 and the data head IC 26 shown in FIG. 4. Hereinafter, each portion will be explained in detail.

The servo head 23 reads out the servo information of the servo surface of the magnetic disk 11 and includes the inductive element. The data heads 24-1 to 24-n read out the data of the data surface and the servo information of the magnetic disk 11, and include the inductive element and the MR element.

The VCM 44 drives the actuator 13 shown in FIG. 3, and the VCM coil 14 is disposed at a part of this VCM 44. The spindle motor (DCM) 10 drives and rotates the magnetic disk 11.

The servo head IC 25 drives the servo head 23. The data head IC 26 drives the data heads 24-1 to 24-n. In this case, the data head IC 26 selects and drives the read head and the write head by the head select signal.

The DSP 27 calculates the moving distance of the head in accordance with the seek command from the MPU 35, makes servo control of the VCM coil 14 of the VCM 44 and controls the spindle motor 10 to attain a constant speed rotation.

The memory 28 is a memory to which access is made by the DSP 27. The servo demodulation circuit 29 demodulates the servo signal read out from the servo head 23 and outputs the signal to the DSP 27. The VCM driver circuit 30 drives the VCM coil 14 of the VCM 44 in accordance with the command quantity of the DSP 27.

The DCM driver circuit 31 drives the spindle motor 10 in accordance with the command quantity of the DSP 27. The communication IC 34 effects information communication between the DSP 27 and the MPU 35.

The demodulation circuit 36 demodulates the read data from the data head IC 26, converts it to a VITERBI code, outputs this code to the encoder/decoder circuit 37 and also outputs the cylinder servo signal to the DSP 27.

The encoder/decoder circuit 37 decodes the VITERBI code sent from the demodulation circuit 36, outputs it to the HDC 43, encodes the write data into the VITERBI code and outputs this code to the data head IC 26.

The bias current control circuit 38 controls the bias current flowing through the data heads 24-1 to 24-n through the data head IC 26 in accordance with the command from the communication IC 34.

The MPU 35 is a processor for interface, and makes various interface controls. The EEPROM 40 is a non-volatile memory to which access is made by the MPU 35. The MPU 35 can write arbitrary data into this memory. Various data (data of position error table, etc) are written in advance into this EEPROM 40.

The DRAM 41 is a volatile memory to which access is made by the MPU 35, and which is used for work by the MPU 35. The HDC 43 has an interface of SCSI (small computer system interface)-2, and effects the analysis of the reception signals and data transmission/reception.

The buffer 42 is a buffer memory to which access is made by the HDC 43, and temporarily stores the data required by this HDC 43 for processing.

§3: Explanation of head . . .

Figure 5A:
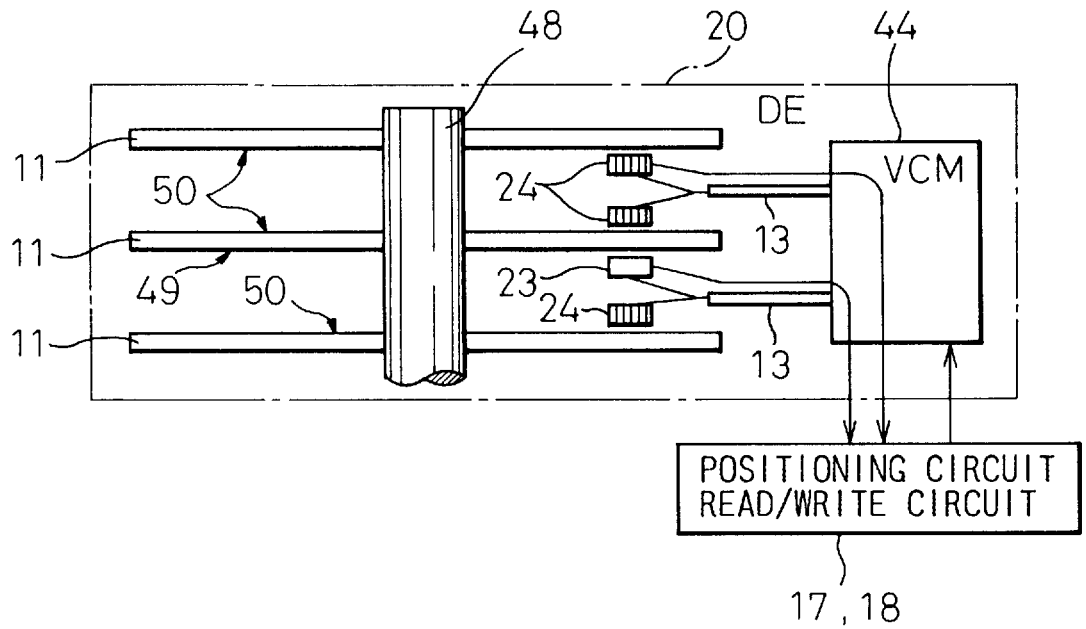
FIGS. 5A and 5B are explanatory views (No. 1) of a head in the preferred embodiment of the present invention.
Figure 5B:
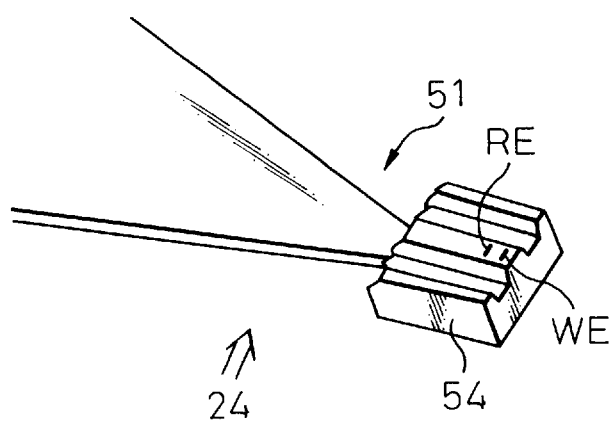
Figure 6A:
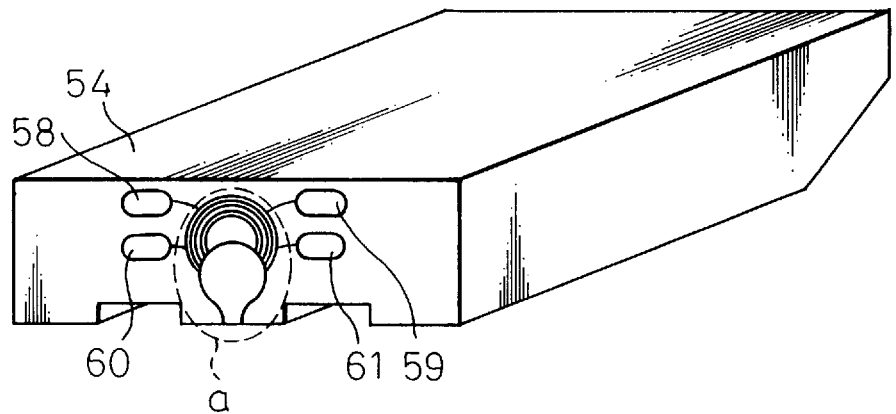
FIGS. 6A to 6C are explanatory views (No. 2) of the head according to the preferred embodiment of the present invention.
Figure 6B:
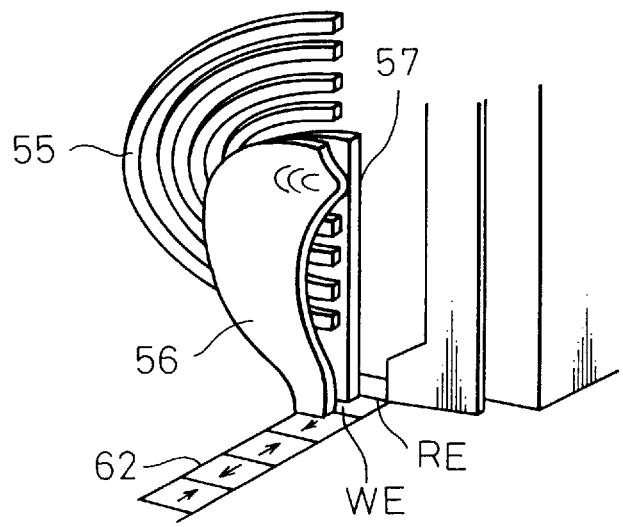
Figure 6C:
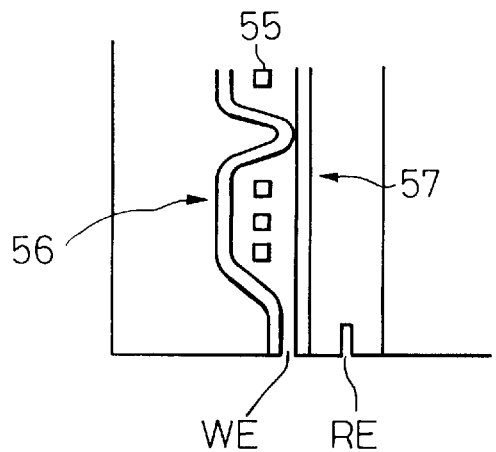

FIGS. 5A and 5B are explanatory views (No. 1) of the head, wherein FIG. 5A is an explanatory view of DE and FIG. 5B is an explanatory view of a head assembly. FIGS. 6A to 6C are explanatory views (No. 2) of the head, wherein FIG. 6A is an enlarged view of a core slider, FIG. 6B is an enlarged view of the "a" portion shown in FIG. 6A, and FIG. 6C is a partial enlarged view of FIG. 6B.

Hereinafter, the head of the magnetic disk drive will be explained with reference to FIGS. 5A to 6C.

As shown in FIG. 5A, a plurality of magnetic disks (recording medium) 11 coupled with the spindle 48 and driven for rotation by the spindle motor are disposed in the DE 20 of the magnetic disk drive.

The servo surface 49 is formed on one of the surfaces of any one of these magnetic disks 11, and the surfaces of the other magnetic disks 11 are all data surfaces 50. A plurality of magnetic disks are disposed on the actuators (head actuators) 13 driven by the VCM 44.

Among these magnetic heads, the magnetic head on the surface side 49 is used as the servo head 23 and the magnetic heads on the data surface side 50 are all data heads 24 (data heads 24-1 to 24-n shown in FIG. 4).

The servo head 23 reads out the servo information of the servo surface 49. The servo information so read is sent to the positioning circuit 18 shown in FIGS. 3 and 4 and is used as the information for effecting positioning control of the head. The data head 24 effects data read/write from and to the data surface 50.

The data head 24 uses the MR element. Hereinafter, the head using the MR element will be explained.

As shown in FIG. 5B, the core slider 54 is disposed at the distal end portion of the head assembly 51 constituting the data head 24, and the write element (inductive element) WE and the read element (MR element) RE are disposed on the core slider 54 with a predetermined gap between them.

As shown in FIGS. 6A to 6C, the coil 55 for causing the write current to flow is disposed in the vicinity of the write element WE and the read element RE, and the upper core 56 and the lower core 57 are disposed in such a manner as to interpose the coil 55 between them.

The head writes the data to the medium by using the write element at the time of data write operation, and reads the data from the medium by using the read element RE at the time of data read operation.

The write element WE is connected to the terminals 58 and 59 (terminals of the inductive element) and the read element RE is connected to the terminals 60, 61 (terminals of the MR element). Reference numeral 62 denotes the recording medium.

§4: Explanation of yaw angle and position error

Figure 8:
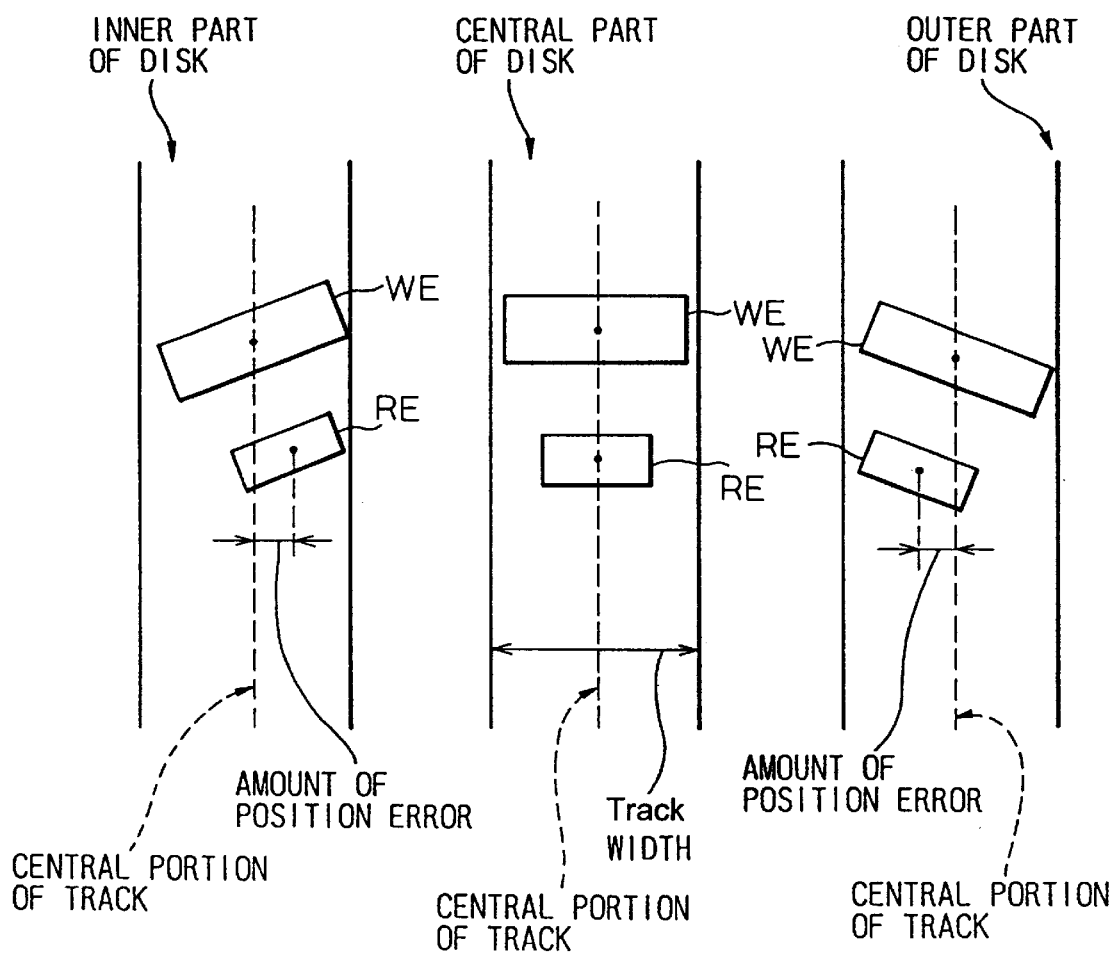
FIG. 8 is an explanatory view (No. 2) of the relation between the yaw angle and the position error in the preferred embodiment of the present invention.

FIG. 7 is an explanatory view (No. 1) of the yaw angle and the position error and FIG. 8 is an explanatory view (No. 2) of the yaw angle and the position error. Hereinafter, the yaw angle and the position error will be explained with reference to FIGS. 7 and 8.

The relation between the head assembly 51 of the data head 24 and the magnetic disk (recording medium) 11 is shown in FIG. 7 (view when the head is viewed from the top). As shown in the drawing, the write element WE and the read element RE (each of which exists at the lower part of the drawing) are fitted to the positions shown in FIG. 7 with respect to the direction of rotation (indicated by an arrow in the drawing) of the magnetic disk 11.

Here, the distance D between the read element RE and the write element WE in the head assembly 51 is constant irrespective of the inner circumference and the outer circumference of the magnetic disk 11. When seek operation is effected, the head assembly 51 is moved by the actuator in the radial direction of the magnetic disk 11 (direction indicated by the arrow in the drawing).

In this case, when seek operation is executed by the rotary type head actuator shown in FIG. 3, the actuator rotates round the rotary shaft 12. Accordingly, as shown in FIG. 7, this head rotates in the radial direction of the magnetic disk 11 in such a manner as to describe an arc at the time of seek operation of the head.

Therefore, the angle of the magnetic head with respect to the track (cylinder) direction (referred to as "yaw angle") varies with the rotating angle of the actuator. In other words, the angle (yaw angle) changes on the inner cylinder side and the outer cylinder side of the magnetic disk. The mode of this change is illustrated in FIG. 8.

FIG. 8 shows the state of each head on the inner and outer sides of the magnetic disk 11. As described above, the yaw angle changes on the inner and outer sides of the magnetic disk. Therefore, though the write element WE and the read element RE are positioned to the track center at the center of the magnetic disk 11, the position error occurs between the write element WE and the read element RE on the inner and outer sides of the magnetic disk 11.

§5: Explanation of data read/write operation

FIGS. 9A to 9D are explanatory views of the data read/write mode, wherein FIG. 9A shows the position error state, FIG. 9B shows the state of format write mode, FIG. 9C shows the state of data write mode, and FIG. 9D shows the state of data read mode. Hereinafter, the read/write mode will be explained with reference to FIGS. 9A to 9D.

As described above, when the MR head is used, the position error occurs between the read element RE and the write element WE. Therefore, in the magnetic disk drive, the amount of the position error between the read head and the write head is measured in advance for each head, and the measurement result data (position error information) is stored in the EEPROM 40 and the magnetic disk 11 shown in FIGS. 3 and 4 (this process will be later explained in detail).

Servo offset is set on the basis of the position error information stored in the EEPROM, etc, and the physical format processing of the medium (format write operation), the data read/write process from and to the recording medium, etc, are carried out.

It will be assumed, for example, that the read element RE and the write element WE have the position error d1 (position error amount=d1) as shown in FIG. 9A. In this case, the position error is represented by setting one of the sides to the positive and the other to the negative with respect to the track center. Accordingly, in the example shown in the drawing, the position error d1 exists on the negative side, To write the data to the medium, it is necessary to execute in advance the physical format processing (format write operation) of the medium and to write the ID portion for each sector by this physical format processing.

In this physical format processing (format write operation), the servo offset is set to –d2 as shown in FIG. 9B.

In other words, the servo offset d2 (offset d2 on the negative side) is set in the same direction as the direction of the position error of the read element RE with respect to the write element WE (position error d1 in one direction), and the ID portion is thus written to the medium.

In this case, since the ID portion is written to the medium under the state where the write element WE deviates towards the negative side by d2 with respect to the track center, the ID portion is written to the position which deviates by d2 on the negative side with respect to the track center. Here, the servo offset d2 is assumed to be a half of the amount of the position error d1 (d2=d1/2).

The data are written to the medium under the state where the physical format processing is made as described above but when the data are written (at the time of data write operation), the ID portion written to the medium is first read to confirm the sector position and then the write process (data write operation) of the data to the data portion (DATA) is executed as shown in FIG. 9C.

At the time of this data write operation, the servo offset is set to 0 and the data write process is effected. In this case, the center of the write element WE exists at the track center but the center of the read element RE deviates towards the negative side by d1 with respect to the track center.

Under this state, the ID portion is first read by the read element RE. In this case, the ID portion exists at the position which deviates by d2 towards the negative side with respect to the track center and the center of the read element RE which deviates by d1 towards the negative side with respect to the track center.

Accordingly, the center of the read element RE is deviated by d1–d2 (d2 <d1) towards the negative side with respect to the ID portion. In other words, the position error of the read head to the ID portion is d1–d2. In this embodiment, since d2=d1/2, the position error of the read head with respect to the ID portion is one half of d1 (d1/2).

As described above, after the ID portion is read by the read head with the position error d1/2 to confirm the sector position, and then the data are written to the data portion (DATA) by the write element WE. In this case, since the position of the write element WE exists at the center of the track, the data portion (DATA) can be written to the track center.

Next, when the data portion (DATA) thus written is read, the servo offset is set to +d1 as shown in FIG. 9D. At this time, the write element WE deviates by d1 towards the positive side with respect to the track center, but the read element RE exists at the track center.

The ID portion deviates by d2 towards the negative side with respect to the track center, but the position error between the read element RE and the ID portion is d2. The data portion (DATA) is read under such a state.

§6: Explanation of processing at the time of measurement of position error

FIG. 10 is a calibration process flowchart at the time of shipment from a factory. Hereinafter, the calibration process at the time of shipment from a factory will be explained with reference to FIG. 10. Incidentally, symbols S1 to S7 represent the processing steps. The following explanation will be made by referring also to FIGS. 3 and 4.

As described above, calibration is made in advance for the magnetic disk drives at the time of shipment from a factory, and the amount of the position error between the read element and the write element is measured for each head. The data of the measurement result (position error information) are stored in the EEPROM 40 and the magnetic disk 11 shown in FIGS. 3 and 4 (the detail of this process will be described later).

In the process described above, the DSP 27 first executes the measurement process in accordance with the command from the MPU 35, and sends the result to the MPU 35. The MPU 35 executes process including calculation and effects write to the EEPROM 40 and the magnetic disk 11.

The position error is measured at the inner and outer cylinders of the magnetic disk 11 for each head, and the amount of the position error so determined is written by the MPU 35 to the EEPROM 40 and the magnetic disk 11.

By the way, the position error of the core of the read element RE and the write element WE includes ① the physical position error of the head; ② the magnetical center error of the read element RE; ③ write expansion of the pattern at the time of write operation; and so forth, but these errors need not be distinguished when the position error is corrected. Accordingly, all of them will be explained merely as the position error in this embodiment.

First, a seek operation is executed under the control of the MPU 35 and the head is positioned to the inner cylinder, for example, and the measurement pattern is written to the data surface of the medium (S1). Thereafter, the DSP 27 reads the measurement pattern from the medium on the basis of the command of the MPU 35, reads the measurement pattern from the medium, and measures the amount of the position error (S2).

When the measurement of the amount of the position error described above is completed, the DSP 27 transfers the data so measured to the MPU 35 through the communication IC 34 (S3). The process of the steps S2 and S3 is repeated a predetermined number of times N (S4).

Next, the MPU 35 calculates the mean value (i.e., average value) of the amount of the position error on the basis of the data transferred thereto from the DSP 27 (S5), and writes the mean value of the amount of the position error to the position error amount table (which will be described later) of the EEPROM 40 (S6).

The mean value of the amount of the position error is also written to the medium under the control of the MPU 35 (S7). After the process at the inner cylinder is completed, the seek operation to the outer cylinder is executed in the same way as described above, and the mean value of the amount of the position error is obtained in the same way as described above and is written to the EEPROM 40 and the magnetic disk 11.

The process S1, S2 described above is executed in the following way, for example. In other words, the seek operation to a predetermined cylinder is executed in the manner described above and after the head is positioned to the target position, track offset is made by a half value (½) of the track width towards the negative side and the measurement pattern is written to the medium (data surface).

Next, track offset is made by a half value (½) of the track width towards the positive side, and the measurement pattern is written to the medium. Further, the head is in on-track condition to the track center and reads the measurement pattern. The position error is measured from the data so read.

The influences of the mechanical offset due to heat, etc, can be avoided by measuring the amount of the position error immediately after write of the measurement pattern as described above.

§7: Explanation of position error amount table

FIG. 11 shows the position error amount table.

As described above, the position error (position error and its direction) is measured at the time of calibration which is made at the time of shipment from the factory, and similar measurement of the position error to this process is periodically carried out during the operation of the magnetic disk drive. The data of the measurement result are stored in the position error amount table of the EEPROM 40.

In this case, the amount of the position error measured by calibration at the time of shipment from the factory is as such stored in the EEPROM 40 and the magnetic disk 11 and is used as the reference position error amount. Accordingly, the amount of the position error measured at the time of operation is stored in a separate table region different from the table region of the amount of the position error.

As shown in FIG. 11, the position error amount table at the time of shipment from the factory and the position error amount table at the time of operation are stored in the EEPROM 40. In this table, each amount of the position error is determined for each of the inner and outer cylinders in such a manner as to correspond to the heads #0, #1, #2, . . . , #n, and the data about the amount of the position error are stored.

By the way, the position error amount table shown in FIG. 11 stores each amount of the position error (a1, b1, c1, . . . , e1, f1, g1, etc.), and a sign representing the direction of the position error (the position error direction with respect to the track center) is added to each amount of the position error. By this arrangement, each amount of the position error and the position error directions can be known for each of the write element and the read element.

During the normal operation, the position error is measured in a predetermined interval (such as one or several months) and the data of the measurement result are stored in the position error amount table at the time of the operation in the EEPROM 40. However, the previous data are sequentially updated.

When measurement of the position error amount during the normal operation is made, the data are not written to the medium, and the data of the position error amount of the medium stored at the time of shipment from the factory are as such stored. When any trouble occurs in the EEPROM, for example, the data of the medium are read and are written to a new EEPROM which is exchanged.

§8: Explanation of physical format processing.

FIG. 12 is a physical format process flowchart. Hereinafter, the physical format processing will be explained with reference to FIG. 11. By the way, symbols S11 to S14 represent the processing steps.

In the physical format processing (format write operation), the ID portion is written to the whole regions of the medium (all cylinder regions) of the medium. This process is the process which writes the ID portion to the medium as the MPU 35 reads out the position error amount for each head from the position error amount table (position error amount table at the time of the operation) of the EEPROM 40 and offsets the head.

First, the MPU 35 reads the position error amount from the EEPROM 40 (S11). It then calculates the offset amount (S12), sets the offset amount as the result of calculation (S13) and writes the ID portion to the medium (S13). This process is executed for all the cylinders by repeating the steps S12 and S13 (S14).

Though the physical format processing is executed as described above, its further detail is as follows.

The MPU 35 determines the amount of the position error for each cylinder and for each track by reading the corresponding data from the position error amount table during the operation which is stored in the EEPROM 40. In this case, since measurement of the position error is not made for cylinders other than the inner and outer cylinders, the amount of the position error for these intermediate cylinders is determined by linear interpolation from the amounts of the position error of the inner and outer cylinders on the basis of the position error amount so read out.

Assuming that the amount of the position error determined by linear interpolation is d1, for example, the MPU 35 sets the offset amount d2 at this time to the half of the amount of the position error d1 (d2=d1/2). In this case, when the direction of the position error amount d1 exists on the negative side as shown in FIGS. 9A to 9D, offset d2, too, is set on the negative side. After offset is set in this way, the ID portion is written to the medium.

As described above, during the physical format processing (format write operation), the MPU 35 reads the amounts of the position error of the inner and outer cylinders stored in the EEPROM 40, and decides the offset amount for each cylinder from that value by interpolation.

In this case, however, the upper limit value is set to the offset amount, and when the amount of the position error exceeds this upper limit value, offset is made by this upper limit value. In other words, when the amount of offset becomes large, adverse influences might be exerted on adjacent tracks and for this reason, a certain upper limit offset amount must be set.

When the physical format processing described above is completed, data write/read is carried out by the method explained with reference to FIGS. 9A to 9D.

§9: Other explanations (1) Periodical off-track correction is made by reading the off-track measurement pattern written to the outer cylinder of the medium under the state where the amount of the position error is corrected as described above.

The measurement patterns for measuring the amount of the position error described above may be used also as the off-track measurement pattern, for example. In other words, the off-track measurement pattern used in the prior art devices may be used as the patterns for measuring the amount of the position error. The number of patterns for measurement can be reduced by so doing.

(2) The amount of the position error for each cylinder and for each track is determined by linear interpolation between two points (outer cylinder and inner cylinder), but it may also be determined by curvelinear interpolation of three or more points besides linear interpolation between the two points.

The amount of the position error may be calculated from a measurement value of at least one position (for example, the measurement value of the inner cylinder) and from the yaw angle.

(3) The measurement of the amount of the position error is periodically made, and when the measurement result greatly changes, only the ID portion is written again. At this time, the measurement patterns of the position error amount and the off-track measurement patterns may be disposed separately, or one of the position error amount measurement patterns may be used also as the off-track measurement pattern so that measurement of the position error can be made by using the patterns at the remaining positions.

§10: Other embodiments

Though the present invention has thus been described with reference to the preferred embodiment thereof, the present invention can be practiced in the following modified ways.

(1) The present invention can be similarly applied to other similar disk devices (such as a magneto-optical disk device) besides the magnetic disk drive.

(2) In foregoing embodiments, the offset amount when the ID is written at the time of format write operation is set to the value half the amount of the position error (position error amount) between the read element and the write element. When the condition at the time of read operation is different from the condition at the time of write operation, however, a margin is made maximal by applying a suitable ratio.

While the present invention has been described as related to the preferred embodiments, it will be understood that various changes and modifications may be made without departing from the spirit and the scope of the invention as hereinafter claimed.

We claim:

1. A disk drive including at least one head for effecting write/read operation of data to and from at least one recording medium, said medium having a plurality of sectors with an ID portion for writing sector information and a data portion for writing data, the disk drive further including positioning means for positioning said head to a target position of said recording medium, wherein a write element and a read element are disposed on said head with a predetermined distance between them, said disk drive comprising:

position error measurement means for measuring an amount of a position error (d1) and the direction of the position error which occurs due to the difference in the position of said write element and a position of said read element when these elements respectively cross a track center;

ID portion write offset decision means for deciding in which direction and with which offset said ID portion should be written when said ID portion is written to said recording medium, in accordance with the position error so measured; and ; and ID portion offset write control means for offsetting only said ID portion in the same direction as that of the position error and writing said ID portion on the basis of an offset value decided by said ID portion write offset decision means when a format processing is executed by writing said ID portion, wherein, when said ID portion is written by offsetting it, the offset direction of said ID portion is set in the same direction as the direction of said position error of said write element and said read element, and the amount of offset (d2) is set to a half value (d2=d1/2) of said position error (d1) of said write element and said read element.

2. A disk drive according to claim 1, comprising a plurality of said heads and a plurality of said media, wherein said position error measurement means measures the position error of said write element and said read element for all of said heads for each position (track) of said recording media.

3. A disk drive according to claim 1, which further comprises a writable non-volatile memory for storing and holding position error information as the result of measurement by said position error measurement means.

4. A disk drive according to claim 1 comprising a plurality of said heads and a plurality of said media, wherein said position error measurement means includes information updating means for updating position error information to the latest position error information by periodically executing a process for measuring the position error of said write element and said read element for each position (track) of said recording media for all of said heads.

5. A method for writing data in a disk drive including at least one head for effecting write/read operation of data to and from at least one recording medium, said recording medium having a plurality of sectors with an ID portion for writing sector information and a data portion for writing data, the disk drive further including positioning means for positioning said head to a target position of said recording medium, wherein a write element and a read element are disposed on said head with a predetermined distance between them, said method comprising the steps of:

measuring a position error (d1) and the direction of the position error which may occur due to the difference in the position of said write element and a position of said read element when these elements respectively cross a track center and a direction of the position error with respect to said track, and storing position error information; and offsetting only an ID portion in the same direction as the direction of said position error so measured in accordance with the amount of said position error, and writing said ID portion, when said ID portion is written to said recording medium to execute a format processing, wherein, when said ID portion is written by offsetting it, the offset direction of said ID portion is set in the same direction as the direction of said position error of said write element and said read element, and the amount of offset (d2) is set to a half value (d2=d1/2) of said position error (d1) of said write element and said read element.

6. A method for writing data in a disk drive according to claim 1, wherein, when said ID portion is written by offsetting it, an upper limit value is set to the amount of offset, and when the amount of offset exceeds said upper limit value, it is limited to said upper limit value.

7. A method for writing a data in a disk drive according to claim 1, the disk drive having a plurality of said heads and a plurality of said media wherein, when said ID portion is written by offsetting it, said write operation is executed for each position (track) on said recording media for all of said heads.

8. A method for writing data in a disk drive according to claim 5, wherein said position error of said-write element and said read element is periodically measured, and when the amount of said position error as the result of measurement exceeds a predetermined value, only said ID portion is written again.

9. A method for writing data in a disk drive according to claim 5, wherein, when the amount of said position error is measured, measuring patterns are offset by a half value (½) of a track width and written to a data surface of said recording medium, and immediately thereafter, the amount of said position error of said write element and said read element is measured from the difference of the outputs obtained by reading said measuring patterns.

10. A method for writing data in a disk drive according to claim 5, wherein when the amount of said position error of said write element and said read element is measured, measurement is made at at least two positions, including at least one position on the outer side of said positions and at least one position on the inner side thereof, and the amount of said position error between said at least two positions is obtained by an interpolation process.

* * * * *

UNITED STATES PATENT AND TRADEMARK OFFICE
CERTIFICATE OF CORRECTION

PATENT NO. : 5,805,373
DATED : September 8, 1998
INVENTOR(S) : Hara et al.

It is certified that error appears in the above-identified patent and that said Letters Patent is hereby corrected as shown below:

Column 5, line 21, delete "is great"

Column 15, line 46, delete "." (period)

UNITED STATES PATENT AND TRADEMARK OFFICE
CERTIFICATE OF CORRECTION

PATENT NO. : 5,805,373
DATED : September 8, 1998
INVENTOR(S) : Hara et al.

It is certified that error appears in the above-identified patent and that said Letters Patent is hereby corrected as shown below:

Column 16, line 31, delete " ; and " (second occurrence)

Column 17, line 5, delete "and the direction of the position error"

Signed and Sealed this

Thirteenth Day of July, 1999

Attest:

Attesting Officer

Q. TODD DICKINSON

Acting Commissioner of Patents and Trademarks